US012573223B2

(12) United States Patent
Zheng

(10) Patent No.: US 12,573,223 B2
(45) Date of Patent: Mar. 10, 2026

(54) HAND-DRAWN GRAPHIC RECOGNITION METHOD, APPARATUS AND SYSTEM, AND COMPUTER-READABLE STORAGE MEDIUM

(71) Applicant: BOE TECHNOLOGY GROUP CO., LTD., Beijing (CN)

(72) Inventor: Rui Zheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 795 days.

(21) Appl. No.: 17/636,629

(22) PCT Filed: Apr. 22, 2021

(86) PCT No.: PCT/CN2021/088951
§ 371 (c)(1),
(2) Date: Feb. 18, 2022

(87) PCT Pub. No.: WO2022/222096
PCT Pub. Date: Oct. 27, 2022

(65) Prior Publication Data
US 2023/0351787 A1 Nov. 2, 2023

(51) Int. Cl.
G06V 30/32 (2022.01)
(52) U.S. Cl.
CPC ............ G06V 30/347 (2022.01); G06V 30/36 (2022.01)
(58) Field of Classification Search
CPC ............................................... G06V 30/00–43
See application file for complete search history.

(56) References Cited

U.S. PATENT DOCUMENTS 6,055,332 A * 4/2000 Aitani .................. G06V 30/373
382/187
9,805,486 B2 * 10/2017 Nagahara .............. G06F 3/0488
(Continued)

FOREIGN PATENT DOCUMENTS

CN 101944175 A 1/2011
CN 104424473 A 3/2015
(Continued)

OTHER PUBLICATIONS

Abu Ghosh et al., "A Comparative Study on Handwriting Digit Recognition Using Neural Networks", 2017 International Conference on Promising Electronic Technologies, pp. 77-81.
(Continued)

*Primary Examiner* — Sean T Motsinger
(74) *Attorney, Agent, or Firm* — The Webb Law Firm

(57) ABSTRACT

This disclosure relates to a hand-drawn graphic recognition method, apparatus, and system, and a computer-readable storage medium. The hand-drawn graphic recognition method includes: receiving an input of a hand-drawn graphic, the input including a stroke set, the stroke set including at least one stroke, each stroke including an information sequence of a plurality of trajectory points, information of each trajectory point including coordinates and writing time of the trajectory point; determining whether the stroke set forms a closed graphic according to coordinate data of the input stroke; and in the case where the stroke set forms a closed graphic, recognizing a category of the closed graphic based on the coordinate data of the stroke.

11 Claims, 5 Drawing Sheets

(56)          References Cited

U.S. PATENT DOCUMENTS

| | | | | |
|---|---|---|---|---|
| 2002/0146175 | A1* | 10/2002 | Goldfoot | G06V 30/422 |
| | | | | 382/181 |
| 2003/0142112 | A1* | 7/2003 | Saund | G06V 30/414 |
| | | | | 345/619 |
| 2005/0063594 | A1* | 3/2005 | Li | G06V 30/1423 |
| | | | | 382/206 |
| 2007/0025618 | A1* | 2/2007 | Lin | G06V 30/347 |
| | | | | 382/186 |
| 2008/0231635 | A1* | 9/2008 | Saund | G06V 30/414 |
| | | | | 345/619 |
| 2008/0232690 | A1* | 9/2008 | Saund | G06V 30/32 |
| | | | | 382/187 |
| 2008/0235211 | A1* | 9/2008 | Saund | G06F 16/9027 |
| 2010/0138756 | A1* | 6/2010 | Saund | H04L 51/216 |
| | | | | 715/758 |
| 2012/0135386 | A1* | 5/2012 | Zaneti | G09B 19/00 |
| | | | | 434/236 |
| 2013/0082949 | A1 | 4/2013 | Kwak et al. | |
| 2013/0147809 | A1* | 6/2013 | Luo | G09G 5/28 |
| | | | | 345/472.3 |
| 2014/0015776 | A1* | 1/2014 | Kim | G06V 30/1456 |
| | | | | 345/173 |
| 2014/0035844 | A1* | 2/2014 | Zhang | G06F 3/041 |
| | | | | 345/173 |
| 2014/0300629 | A1* | 10/2014 | Yokoyama | G06V 30/347 |
| | | | | 345/619 |
| 2015/0035778 | A1* | 2/2015 | Hirakawa | G06F 3/04845 |
| | | | | 345/173 |
| 2016/0048318 | A1* | 2/2016 | Markiewicz | G06F 3/03545 |
| | | | | 345/173 |
| 2016/0300321 | A1* | 10/2016 | Naya | G06V 30/36 |
| 2017/0097762 | A1* | 4/2017 | Sugano | G06F 3/04883 |
| 2018/0067971 | A1* | 3/2018 | Yan | G06V 10/22 |
| 2018/0239434 | A1* | 8/2018 | Lu | G06T 11/203 |
| 2019/0114477 | A1* | 4/2019 | Mano | G06V 10/95 |
| 2019/0286894 | A1* | 9/2019 | Maruoka | G06V 30/1423 |
| 2019/0347953 | A1* | 11/2019 | Won | G06V 30/00 |
| 2022/0300239 | A1* | 9/2022 | Nakamura | H04N 7/147 |
| 2022/0300240 | A1* | 9/2022 | Mori | G06F 3/1462 |
| 2023/0012060 | A1* | 1/2023 | Kosaka | G06V 30/347 |
| 2023/0043998 | A1* | 2/2023 | Yoshida | G06F 3/04883 |
| 2023/0351787 | A1* | 11/2023 | Zheng | G06V 30/36 |
| 2024/0211127 | A1* | 6/2024 | Wu | G06V 30/1423 |

FOREIGN PATENT DOCUMENTS

| | | |
|---|---|---|
| CN | 105071814 A | 11/2015 |
| CN | 105117054 A | 12/2015 |
| CN | 105719328 A | 6/2016 |
| CN | 104714666 B | 9/2017 |
| CN | 110263302 A | 9/2019 |
| CN | 111626238 A | 9/2020 |
| CN | 111898593 A | 11/2020 |
| CN | 112181207 A | 1/2021 |

OTHER PUBLICATIONS

Lai et al., "Space Handwriting Character Recognition Method Based on Elimination of Connected Stroke", Computer Engineering, Oct. 2012, pp. 154-158, vol. 38, No. 19. Abstract.

* cited by examiner

S1:receiving an input of a hand-drawn graphic, the input comprising a stroke set S3:determining whether the stroke set forms a closed graphic according to coordinate data of an input stroke S5:in the case where the stroke set forms a closed graphic, recognizing a category of the closed graphic based on the coordinate data of the stroke (a)

(b)

(c)

(d)

(e)

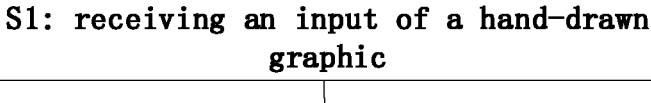

S1: receiving an input of a hand-drawn graphic

S3: determining whether a stroke set forms a closed graphic according to coordinate data of an input stroke S5: in the case where the stroke set forms a closed graphic, recognizing a category of the closed graphic based on the coordinate data of the stroke S7: positioning key points of the hand-drawn graphic S9: outputting a drawn graphic

Fig. 2

S71: calculating coordinate offsets between trajectory points, the coordinate offsets comprising abscissa offsets and ordinate offsets S72: dividing the coordinate offsets into a plurality of intervals according to the abscissa offsets and ordinate offsets between the trajectory points S73: positioning the key points of the hand-drawn graphic according to a relation between intervals to which the coordinate offsets belong

Fig. 2A

HAND-DRAWN GRAPHIC RECOGNITION METHOD, APPARATUS AND SYSTEM, AND COMPUTER-READABLE STORAGE MEDIUM

CROSS-REFERENCE TO RELATED APPLICATION

This application is the United States national phase of International Application No. PCT/CN2021/088951 filed Apr. 22, 2021, the disclosure of which is hereby incorporated by reference in its entirety.

TECHNICAL FIELD

The present disclosure relates to the technical field of computer, and particularly, to a hand-drawn graphic recognition method, apparatus, and system, and a computer-readable storage medium.

BACKGROUND

Compared with a traditional keyboard input, a hand-drawing input is widely applied due to its advantages such as simplicity and efficiency. Hand-drawing recognition provides convenience for natural human-computer interaction. With the development of technology, a touch screen provides a user with a better hand-drawing input mode, allowing the user to input a variety of graphics online.

A related hand-drawn graphic recognition technique is mainly based on image recognition, to output a standard graphic corresponding to a hand-drawn graphic, for example, a symmetric graphic such as a circle, square, rectangle, isosceles triangle, and thus cannot effectively meet requirements of more complex scenes.

SUMMARY

According to some embodiments of the present disclosure, there is provided a hand-drawn graphic recognition method, comprising: receiving an input of a hand-drawn graphic, the input comprising a stroke set, the stroke set comprising at least one stroke, each stroke comprising an information sequence of a plurality of trajectory points, information of each trajectory point comprising coordinates and writing time of the trajectory point;

determining whether the stroke set forms a closed graphic according to coordinate data of the input stroke; and in the case where the stroke set forms the closed graphic, recognizing a category of the closed graphic based on the coordinate data of the stroke.

In some embodiments, the stroke set comprises a plurality of strokes, each stroke comprising two end points, the information of each trajectory point further comprising a writing state value of the trajectory point, wherein the writing state value is used for representing a writing state of the trajectory point, the writing state of the trajectory point comprises a pen-up and a pen-down, and the determining whether the stroke set forms a closed graphic according to coordinate data of the input stroke comprises:

determining whether an interval between pen-down time of a received current stroke and pen-up time of one previous stroke is less than an acquisition time threshold; and in the case where the interval is less than the acquisition time threshold, taking the current stroke as a jth stroke of the stroke set, and determining whether the stroke set forms a closed graphic according to a connection relation between an end point of the current stroke and previous strokes, where j is a positive integer greater than 1.

In some embodiments, in the case where a distance between an end point of one stroke and either end point of another stroke is less than a distance threshold, a connection relation is formed between the end point of the one stroke and the another stroke, and the determining whether the stroke set forms a closed graphic according to a connection relation between an end point of the current stroke and previous strokes comprises:

in the case where one end point of the current stroke and a (j−m)th stroke form a connection relation and the other end point of the current stroke and a (j−n)th stroke form a connection relation, determining that the stroke set forms the closed graphic, where m and n are positive integers, and m is greater than or equal to n, wherein a connection relation is formed between the previous strokes but the previous strokes do not form a closed graphic.

In some embodiments, in the case where either end point of the current stroke and the previous strokes do not form a connection relation, it is determined that no connection relation is formed between the current stroke and the previous strokes and the stroke set does not form a closed graphic, and no graphic recognition is performed.

In some embodiments, in the case where one end point of the current stroke and one stroke in the previous strokes form a connection relation, but the other end point of the current stroke and other strokes do not form a connection relation, it is determined that a connection relation is formed between the current stroke and the previous strokes but the stroke set does not form a closed graphic, and determined whether a (j+1)th stroke is received within the acquisition time threshold;

in the case where the (j+1)th stroke is received within the acquisition time threshold, taking the (j+1)th stroke as the current stroke of the stroke set, and determining whether the stroke set forms a closed graphic according to the connection relation between the end point of the current stroke and the previous strokes; and in the case where the (j+1)th stroke is not received within the acquisition time threshold, no graphic recognition is performed.

In some embodiments, the hand-drawn graphic recognition method further comprises storing end-point values of the stroke in a storage area, wherein:

two end-point values are stored in the storage area, the two end-point values comprising a first end-point value and a second end-point value;

for a first stroke, two end-point values of the first stroke are a first end-point value and a second end-point value, respectively;

for a jth stroke, a connection relation between the jth stroke and previous strokes is determined according to a relation between an end-point value of the jth stroke and the first end-point value and the second end-point value in the storage area, and in the case where the jth stroke and the previous strokes form the connection relation but do not form a closed graphic, an end-point value in the previous strokes connected with the jth stroke is replaced with an end-point value in the jth stroke not connected with the previous strokes in the storage area.

In some embodiments, the stroke set comprises a plurality of consecutive strokes, each stroke comprising two end points, an interval between pen-down time of each stroke and pen-up time of one previous stroke in the plurality of consecutive strokes being less than the acquisition time threshold, and the determining whether the stroke set forms a closed graphic according to coordinate data of the input stroke comprises:

sequentially taking a stroke in the plurality of consecutive strokes as a to-be-processed stroke according to a time sequence, and determining whether the stroke set forms a closed graphic according to a connection relation between an end point of the to-be-processed stroke and previous strokes, wherein the to-be-processed stroke is a jth stroke in the stroke set, and j is a positive integer greater than 1.

In some embodiments, in the case where a distance between an end point of one stroke and either end point of another stroke is less than a distance threshold, a connection relation is formed between the end point of the one stroke and the another stroke, and the determining whether the stroke set forms a closed graphic according to a connection relation between an end point of the to-be-processed stroke and previous strokes comprises:

in the case where one end point of the to-be-processed stroke and a (j−m)th stroke form a connection relation and the other end point of the to-be-processed stroke and a (j−n)th stroke form a connection relation, determining that the stroke set forms the closed graphic, where m and n are positive integers, and m is greater than or equal to n;

in the case where either end point of the to-be-processed stroke and the previous strokes do not form a connection relation, determining that no connection relation is formed between the to-be-processed stroke and the previous strokes and the stroke set does not form a closed graphic either; and in the case where one end point of the to-be-processed stroke and one stroke in the previous strokes form a connection relation, but the other end point of the to-be-processed stroke and other strokes do not form a connection relation, determining that a connection relation is formed between the to-be-processed stroke and the previous strokes but the stroke set does not form a closed graphic, wherein a connection relation is formed between the previous strokes but the previous strokes do not form a closed graphic.

In some embodiments, in the case where it is determined that a connection relation is formed between the to-be-processed stroke and the previous strokes but the stroke set does not form a closed graphic, a (j+1)th stroke is taken as the to-be-processed stroke of the stroke set, and it is determined whether the stroke set forms a closed graphic according to the connection relation between the end point of the to-be-processed stroke and the previous strokes; and in the case where no connection relation is formed between the to-be-processed stroke and the previous strokes and the stroke set does not form a closed graphic, no graphic recognition is performed.

In some embodiments, the hand-drawn graphic recognition method further comprises: for the first stroke in the stroke set, recognizing a category of a graphic formed by the stroke, and when the recognized category is a specified graphic, performing a handwriting processing operation preset for the specified graphic.

In some embodiments, when the recognized category is not the specified graphic, it is determined whether the stroke forms a closed graphic; when a closed graphic is formed, a category of the closed graphic is recognized; when no closed graphic is formed, it is determined whether a second stroke is received within the acquisition time threshold; and in the case where the second stroke is received within the acquisition time threshold, the second stroke is taken as a current stroke, and it is determined whether the second stroke and the first stroke form a closed graphic.

In some embodiments, the handwriting processing operation comprises: erasing, canceling, marking, or highlighting.

In some embodiments, the specified graphic comprises: a shape of an inverted N, a multi-broken line or a shape of "Z".

In some embodiments, in the case where the specified graphic is the shape of "Z", an erasing operation is performed.

In some embodiments, the hand-drawn graphic recognition method further comprises: outputting a corrected drawn graphic corresponding to the hand-drawn graphic according to the category of the closed graphic.

In some embodiments, the hand-drawn graphic recognition method further comprises:

positioning key points of the hand-drawn graphic based on coordinate offsets between the trajectory points; and outputting a corrected drawn graphic corresponding to the hand-drawn graphic according to the category of the closed graphic and the key points.

In some embodiments, the key points are corner points.

In some embodiments, the hand-drawn graphic recognition method further comprises:

according to the coordinate data of the input stroke, determining whether a length of the stroke is within a preset length;

in the case where the length of the stroke is within the preset length, performing a closed-graphic recognition by using the stroke; and in the case where the length of the stroke is beyond the preset length, performing no graphic recognition.

In some embodiments, the recognizing a category of the closed graphic comprises: recognizing the category of the closed graphic by using a deep learning algorithm.

In some embodiments, the deep learning algorithm comprises a recurrent neural network.

In some embodiments, the category of the graphic comprises at least one of polygon, circle, and ellipse.

In some embodiments, the hand-drawn graphic recognition method further comprises:

Before recognizing the category of the closed graphic, performing sparse sampling on the trajectory points according to a preset distance threshold, and obtaining a trajectory point set; and/or performing sparse sampling on the trajectory point set according to the number of trajectory points required by the recognition of the category of the closed graphic.

In some embodiments, at a terminal side, it is determined whether the stroke set forms a closed graphic according to the coordinate data of the input stroke, and in the case where the stroke set forms a closed graphic, the coordinate data of the corresponding stroke is sent to a cloud; and at a cloud side, the category of the closed graphic is recognized based on the coordinate data of the stroke.

According to other embodiments of the present disclosure, there is provided a hand-drawn graphic recognition method, comprising:

receiving an input of a hand-drawn graphic, the input comprising a stroke set, the stroke set comprising at least one stroke, each stroke comprising an information sequence of a plurality of trajectory points, information of each trajectory point comprising coordinates and writing time of the trajectory point;

recognizing a category of the hand-drawn graphic according to coordinate data of the input stroke;

positioning key points of the hand-drawn graphic; and outputting a corrected drawn graphic corresponding to the hand-drawn graphic according to the category and the key points of the hand-drawn graphic.

In some embodiments, the positioning key points of the hand-drawn graphic comprises:

positioning the key points of the hand-drawn graphic based on coordinate offsets between trajectory points.

In some embodiments, the positioning the key points of the hand-drawn graphic based on coordinate offsets between trajectory points comprises:

calculating the coordinate offsets between the trajectory points, wherein the coordinate offsets comprises abscissa offsets and ordinate offsets;

dividing the coordinate offsets into a plurality of intervals according to the abscissa offsets and the ordinate offsets between the trajectory points; and positioning the key points of the hand-drawn graphic according to a relation between the intervals to which the coordinate offsets belong.

In some embodiments, for an information sequence comprising trajectory points $P_i$, $P_{i+1}$, $P_{i+2}$ . . . $P_{i+n}$, let a coordinate offset between trajectory points $P_{i+n+1}$ and $P_{i+n}$ be $O_n$, a coordinate offset between trajectory points $P_{i+n}$ and $P_{i+n-1}$ be $O_{n-1}$, and the coordinate offsets $O_n$ and $O_{n-1}$ are adjacent coordinate offsets, the positioning the key points of the hand-drawn graphic according to a relation between the intervals to which the coordinate offsets belong comprises:

in the case where there is a space between the intervals to which the adjacent coordinate offsets $O_n$ and $O_{n-1}$ belong, positioning the key points of the hand-drawn graphic based on the trajectory point $P_{i+n}$ to which the adjacent coordinate offsets $O_n$ and $O_{n-1}$ jointly correspond, where i is a positive integer, and n is a positive integer greater than 1.

In some embodiments, the positioning the key points of the hand-drawn graphic according to a relation between the intervals to which the coordinate offsets belong further comprises:

in the case where the intervals to which the adjacent coordinate offsets $O_n$ and $O_{n-1}$ belong are adjacent, determining whether a first included angle between a line connected between the trajectory points $P_{i+n}$ and $P_{i+n+1}$ corresponding to $O_n$ and a line connected between the trajectory points $P_{i+n-1}$ and $P_{i+n}$ corresponding to $O_{n-1}$ is greater than a first angle threshold; and in the case where the first included angle is greater than the first angle threshold, positioning the key points of the hand-drawn graphic based on the trajectory point $P_{i+n}$ to which the adjacent coordinate offsets $O_n$ and $O_{n-1}$ jointly correspond.

In some embodiments, the positioning the key points of the hand-drawn graphic according to a relation between the intervals to which the coordinate offsets belong further comprises:

in the case where the first included angle is not greater than the first angle threshold, or in the case where the intervals to which the adjacent coordinate offsets $O_n$ and $O_{n-1}$ belong are the same, if an offset between offsets $O_{n-k}$ and $O_{n-1}$ is the same as the interval to which $O_{n-1}$ belongs but intervals to which the offsets $O_{n-k}$ and $O_{n-1}$ belong are different, determining whether a second included angle between a line connected between a trajectory point $P_{i+n-k+1}$ or $P_{i+n-k+2}$ corresponding to an offset $O_{n-k+1}$ and the trajectory point $P_{i+n}$ corresponding to $O_n$ and a line connected between the trajectory points $P_{i+n}$ and $P_{i+n+1}$ corresponding to $O_n$ is greater than a second angle threshold, where k is a positive integer greater than 2, and n is a positive integer greater than 3; and in the case where the second included angle is greater than the second angle threshold, positioning the key points of the hand-drawn graphic based on the trajectory point $P_{i+n}$ to which the adjacent coordinate offsets $O_n$ and $O_{n-1}$ jointly correspond.

In some embodiments, the positioning the key points of the hand-drawn graphic according to a relation between the intervals to which the coordinate offsets belongs further comprises:

in the case where the first included angle is not greater than the first angle threshold, or in the case where the intervals to which the adjacent coordinate offsets $O_n$ and $O_{n-1}$ belong are the same, if an offset between offsets $O_{n+k}$ and $O_n$ is the same as the interval to which $O_n$ belongs but intervals to which the offsets $O_{n+k}$ and $O_n$ belong are different, determining whether a second included angle between a line connected between a trajectory point $P_{i+n+k-1}$ or $P_{i+n+k}$ corresponding to an offset $O_{n+k-1}$ and a line connected between the trajectory points $P_{i+n-1}$ and $P_{i+n}$ corresponding to $O_{n-1}$ is greater than the second angle threshold, where k is a positive integer greater than 2, and n is a positive integer greater than 3; and in the case where the second included angle is greater than the second angle threshold, positioning the key points of the hand-drawn graphic based on the trajectory point $P_{i+n}$ to which the adjacent coordinate offsets $O_n$ and $O_{n-1}$ jointly correspond.

In some embodiments, the positioning the key points of the hand-drawn graphic according to a relation between the intervals to which the coordinate offsets belong further comprises:

respectively performing reassignment on the abscissa offsets and the ordinate offsets between the trajectory points according to the intervals to which the coordinate offsets belong; and determining the relation between the intervals to which the coordinate offsets belong according to the reassignment.

In some embodiments, the key points are corner points.

In some embodiments, the hand-drawn graphic recognition method further comprises:

before positioning the key points of the hand-drawn graphic, performing sparse sampling on the trajectory points according to a preset distance threshold, to obtain a trajectory point set; and/or performing sparse sampling on the trajectory point set according to the number of trajectory points required by positioning the key points of the hand-drawn graphic.

According to still other embodiments of the present disclosure, there is provided a hand-drawn graphic recognition apparatus, comprising:

a memory; and a processor coupled to the memory, the processor being configured to perform, based on instructions stored in the memory device, one or more steps of the hand-drawn graphic recognition method according to any of the above embodiments.

According to further embodiments of the present disclosure, there is provided a hand-drawn graphic recognition system, comprising:

a touch screen configured to receive an input of a hand-drawn graphic and generate an information sequence comprising a plurality of trajectory points when a user hand-draws the graphic on the touch screen; and the hand-drawn graphic recognition apparatus according to the above embodiments.

In some embodiments, the hand-drawn graphic recognition apparatus comprises:

a first processor located at a terminal and configured to determine whether a stroke set forms a closed graphic according to coordinate data of an input stroke; and a second processor located at a cloud and configured to recognize, in the case where the stroke set forms a closed graphic, a category of the closed graphic based on the coordinate data of the stroke, or to position key points of a hand-drawn graphic.

According to other embodiments of the present disclosure, there is provided a computer-readable storage medium having thereon stored a computer program which, when executed by a processor, implements one or more steps of the hand-drawn graphic recognition method according to any of the above embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the present disclosure and together with the description, serve to explain principles of the present disclosure.

The present disclosure can be more clearly understood from the following detailed description made with reference to the accompanying drawings, in which:

FIG. 2 is a flow diagram illustrating a hand-drawn graphic recognition method according to another embodiment of the present disclosure;

FIG. 2A is a flow diagram illustrating positioning key points of the hand-drawn graphic according to one embodiment of the present disclosure;

It should be understood that sizes of various portions illustrated in the drawings are not drawn to actual scale. Furthermore, identical or similar reference numerals denote identical or similar components.

DETAILED DESCRIPTION

Figures 1, 1A:
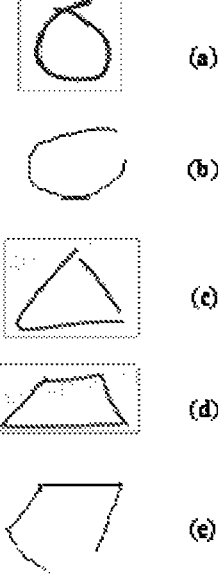
FIG. 1 is a flow diagram illustrating a hand-drawn graphic recognition method according to one embodiment of the present disclosure.
FIG. 1A is a schematic diagram illustrating a hand-drawn graphic according to one embodiment of the present disclosure.

Various exemplary embodiments of the present disclosure will now be described in detail with reference to the accompanying drawings. The description of the exemplary embodiments is merely illustrative and is in no way intended to limit this disclosure, its application, or uses. The present disclosure can be implemented in many different forms and is not limited to the embodiments described herein. Provision of these embodiments is to make this disclosure thorough and complete and fully convey the scope of this disclosure to those skilled in the art. It should be noted that: relative arrangements of components and steps set forth in these embodiments should be construed to be merely exemplary instead of restrictive unless specifically stated otherwise.

All terms (including technical or scientific terms) used in the present disclosure have the same meanings as those understood by one of ordinary skill in the art to which this disclosure pertains unless specifically defined otherwise. It should also be understood that terms, such as those defined in common dictionaries, should be interpreted as having meanings consistent with their meanings in the context of the related art and should not be interpreted with idealized or extremely formalized meanings unless expressly defined herein.

Techniques, methods, and apparatuses known to one of ordinary skill in the related art may not be discussed in detail but are intended to be part of the specification where appropriate.

A user may, when hand-drawing graphics on a device such as a whiteboard, draw various irregular graphics, for example, asymmetric graphics, which cannot be recognized effectively by a known graphic recognition technique. In order to correctly and effectively recognize various and complex hand-drawn graphics, the present disclosure provides a novel hand-drawn graphic recognition solution.

According to the present disclosure, by means of a hand-drawn trajectory, for example, coordinate information of trajectory points acquired in real time in a drawing process of the user, it is determined whether the user has completed the drawing of the graphic and what a target graphic the user has drawn. In some embodiments of the present disclosure, it can also be further determined what a specific category of the target graphic is and whether the graphic is a conventional regular polygon or a circle or an oblique (e.g., non-equilateral) polygon. In other embodiments, key points (e.g., inflection points or corner points) of the target graphic can also be positioned based on the information of the trajectory points. By using the information, a geometric graphic meeting the requirements of the user can be drawn, so that a better human-computer interaction effect is realized.

FIG. 1 is a flow diagram illustrating a hand-drawn graphic recognition method according to one embodiment of the present disclosure. As shown in FIG. 1, the hand-drawn graphic recognition method comprises: step S1, receiving an input of a hand-drawn graphic; step S3, determining whether a stroke set forms a closed graphic according to coordinate data of an input stroke; in step S5, in the case where the stroke set forms a closed graphic, recognizing a category of the closed graphic based on the coordinate data of the stroke.

In the step S1, the stroke set is input, the stroke set comprising at least one stroke, each stroke comprising an information sequence of a plurality of trajectory points. Information of each trajectory point comprises coordinates and writing time of the trajectory point. Information of each trajectory point further comprises a writing state value of the trajectory point. The writing state value is used for representing a writing state of the trajectory point, and the writing state of the trajectory point comprises a pen-up and a pen-down. For example, a writing state value can be a first value representing a pen-up of a stroke or a second value representing a pen-down. For example, a writing state value of an endpoint trajectory point of one stroke is a first value (e.g., 1) representing a pen-up, and a writing state value of a start-point trajectory point of one stroke is a second value (e.g., 0) representing a pen-down. Of course, the writing state value can further comprise a third value representing a pen-pressing writing or pen-wielding. That is, the trajectory points can be divided into corresponding strokes according to the writing state value of each trajectory point.

In some embodiments, the information sequence comprising the plurality of trajectory points is generated when the graphic is hand-drawn on a touch screen. For example, when writing on a touch screen such as an electromagnetic screen and a capacitive screen, a hand-drawn trajectory point information sequence stored in a time sequence is acquired. In other embodiments, a terminal such as a conference all-in-one machine, a mobile phone, and an intelligent ink tablet acquires a hand-drawn trajectory point information sequence generated when the graphic is drawn on the touch screen by using software, and can transmit the hand-drawn trajectory point information sequence to a cloud service side or an embedded terminal according to actual requirements of services.

To recognize the hand-drawn graphic inputted by the user, a to-be-recognized object is first positioned. For example, it is determined which strokes form closed graphics, and then the closed graphics are recognized based on these strokes, respectively. In the step S3, it is determined whether the stroke set forms a closed graphic based on coordinates of trajectory points included in the stroke. Here, the stroke set can comprise one stroke or a plurality of strokes. Each stroke comprises two end points. It should be understood that the closed graphic is not necessarily strictly closed. The detailed description will be made below in conjunction with FIG. 1A.

FIG. 1A is a schematic diagram illustrating a hand-drawn graphic according to one embodiment of the present disclosure.

In the case where the input is one stroke, as shown in (a) and (b) of FIG. 1A, the determining whether the stroke forms a closed graphic comprises: determining whether a distance between pen-down and pen-up positions of the stroke is less than a distance threshold. That is, in the case where the distance between the pen-down position where the handwriting of one stroke starts and the pen-up position where the handwriting of the stroke ends is less than the distance threshold, as shown in (a) of FIG. 1A, the stroke can be considered to form a closed graphic. However, as shown in (b) of FIG. 1A, a distance between pen-down and pen-up positions of one stroke is great, and the stroke is not considered to form a closed graphic.

In some embodiments, for a first stroke (which can be determined according to a stroke count) in the stroke set, the recognition of a category of the graphic can be first per-formed directly instead of first determining whether the stroke forms a closed graphic. In the case where the recognized category is a specified graphic, such as a shape of an inverted "N", a multi-broken line or a shape of "Z", a preset handwriting process is performed for the specified graphic. The handwriting process comprises: erasing, canceling, marking, or highlighting, etc. For example, in the case where the specified graphic is a shape of "Z", an erasing operation is performed. Performing the preset handwriting process by using the specified graphic can provide faster operation experience.

When the recognized category is not the specified graphic, it is determined whether the stroke forms a closed graphic; when a closed graphic is formed, a category of the closed graphic is recognized; when no closed graphic is formed, it is determined whether a second stroke is received within an acquisition time threshold; and in the case where the second stroke is received in the acquisition time threshold, the second stroke is taken as a current stroke, and it is determined whether the second stroke and the first stroke form a closed graphic. Subsequently, a further process can be performed according to the case where the stroke set comprises a plurality of strokes.

In some embodiments, the distance threshold is a value dynamically determined according to coordinates of trajectory points, and thus can be adaptively adjusted according to a feature of the hand-drawn graphic. Of course, the distance threshold can also be set to a fixed value according to actual needs.

In the case where the stroke set comprises a plurality of strokes, as shown in (c) to (e) of FIG. 1A, the determining whether the stroke set forms a closed graphic comprises: determining whether an interval between pen-down time of one stroke and pen-up time of one previous stroke is less than the acquisition time threshold; in the case where the interval is less than an acquisition time threshold, it is determined whether an end point of the one stroke and previous strokes form a connection relation. In the case where a distance between the end point of one stroke and either end point of another stroke is less than a distance threshold, a connection relation is formed between the end point of the one stroke and the another stroke. That is, in the case where a time interval between consecutive strokes is less than the acquisition time threshold (e.g., 1 second, 3 seconds, or other time), these consecutive strokes are considered to belong to a same graphic, and strokes between which the time interval exceeds the acquisition time threshold are not considered to belong to a same graphic. And according to a connection relation between an end point of a current stroke and previous strokes, it is determined whether the stroke set forms a closed graphic. In the case where connection relations are formed between all the consecutive strokes, as shown in (c) and (d) of FIG. 1A, these consecutive strokes can be considered to form a closed graphic. However, as shown in (e) of FIG. 1A, in the case where there is two strokes that do not form a connection relation, that is, the case where there is a great distance between one end point in one stroke and an end point of another stroke, it is considered that these strokes do not form a closed graphic.

For the strokes which do not form a closed graphic, they are outputted as they are. In some embodiments, in view of an actual scene, when a length of a stroke is abnormal, for example, a length of a stroke exceeds a preset length, that is, the length of the stroke is very long or very short, the stroke can be considered as abnormal data, and no graphic recognition is performed, for example, the stroke can be outputted as it is, or nothing is displayed. That is, the hand-drawn graphic recognition method further comprises: determining whether a length of the stroke is within a preset length according to coordinate data of the input stroke. In the case where the length of the stroke is within the preset length, the recognition of the closed graphic is performed by using the stroke; and in the case where the length of the stroke is beyond the preset length, no graphic recognition is performed. The determining whether a length of the stroke is abnormal can be made before or after determining whether consecutive strokes form a closed graphic. By such an arrangement, the efficiency of graphic recognition can be improved.

For the above step of determining whether the stroke set forms a closed graphic, it can be selected to perform a real-time determining for each received current stroke or to perform a centralized determining for a plurality of consecutive strokes, according to a relation between a processing speed of a processor and an input speed of the hand-drawn graphic. The two cases will be described in detail below in conjunction with different embodiments, respectively.

In some embodiments, a real-time determining is made for each received current stroke, that is, a connection relation between an end point of the current stroke and previous strokes is judged, and then it is determined whether the stroke set forms a closed graphic.

The determining whether the stroke set forms a closed graphic according to coordinate data of the input stroke comprises: judging whether an interval between pen-down time of the received current stroke and pen-up time of one previous stroke is less than the acquisition time threshold; and in the case where the interval is less than the acquisition time threshold, the current stroke is taken as a jth stroke of the stroke set, it is determined whether the stroke set forms a closed graphic according to the connection relation between the end point of the current stroke and the previous strokes, where j is a positive integer greater than 1. A connection relation is formed between the previous strokes but the previous strokes do not form a closed graphic, for example, it is judged whether an interval between pen-down time of a jth stroke and pen-up time of a (j−1)th stroke in the stroke set is less than the acquisition time threshold; and in the case where the interval is less than the acquisition time threshold, the jth stroke is added into the stroke set, and according to a connection relation between an end point of the jth stroke and first to (j−1)th strokes, it is determined whether the first to jth strokes form a closed graphic. Here, a connection relation between the previous strokes are formed but the previous strokes do not form a closed graphic, that is, the (j−1)th stroke and its previous strokes form a connection relation but do not form a closed graphic.

In the case where one end point of the current stroke and a (j−m)th stroke form a connection relation and the other end point of the current stroke and a (j−n)th stroke form a connection relation, it is determined that the stroke set forms a closed graphic, where m and n are positive integers, and m is greater than or equal to n.

In the case where either end point of the current stroke and previous strokes form no connection relation, it is determined that no connection relation is formed between the current stroke and the previous strokes and the stroke set does not form a closed graphic.

In the case where one end point of the current stroke and one stroke in the previous strokes form a connection relation, but the other end point of the current stroke and other strokes form no connection relation, it is determined that the stroke set forms a connection relation but does not form a closed graphic, and no graph recognition is performed.

In the case where it is determined that the stroke set forms a connection relation but does not form a closed graphic, it is determined whether a (j+1)th stroke is received within the acquisition time threshold; in the case where the (j+1)th stroke is received within the acquisition time threshold, the (j+1)th stroke is taken as a current stroke of the stroke set, and it is determined whether the stroke set forms a closed graphic according to a connection relation between an end point of the current stroke and previous strokes; and in the case where the (j+1)th stroke is not received within the acquisition time threshold, no graphic recognition is performed, for example, the stroke set is outputted as it is.

The above cases will be described below by taking j=3, m=2, n=1, and the first to second strokes form a connection relation but do not form a closed graphic as an example.

In the case where one end point of a third stroke and the first stroke form a connection relation, and the other end point of the third stroke and the second stroke form a connection relation, it is determined that the first to third strokes form a closed graphic.

In the case where either end point of the third stroke and the first and second strokes form no connection relation, it is determined that the third stroke and the previous strokes form neither a connection relation nor a closed graphic. In this case, the first to third strokes are outputted as they are, and the stroke count can be cleared.

In the case where one end point of the third stroke and the first stroke form a connection relation, but the other end point of the third stroke and the second stroke form no connection relation, it is determined that the third stroke and the previous strokes form a connection relation but do not form a closed graphic.

In the case where it is determined that the third stroke and the previous strokes form a connection relation but do not form a closed graphic, it is further determined whether a fourth stroke is received within the acquisition time threshold. In the case where the fourth stroke is received, the fourth stroke is taken as the current stroke, the forgoing determining is performed again, i.e., it is determined whether the stroke set forms a closed graphic according to a connection relation between an end point of the current stroke and previous strokes. In the case where the fourth stroke is not received within the acquisition time threshold, the first to third strokes are outputted as they are. In the case of outputting the strokes as they are, the stroke count can be cleared to facilitate determining of a relation between subsequent strokes.

In some embodiments, the hand-drawn graphic recognition method further comprises storing end-point values of the stroke in a storage area. Two end-point values are stored in the storage area, the two end-point values including a first end-point value and a second end-point value.

For the first stroke, two end-point values of the first stroke are a first end-point value and a second end-point value, respectively. For the second stroke, a connection relation between the second stroke and the first stroke is determined according to a relation between an end-point value of the second stroke and the first end-point value and the second end-point value in the storage area, and in the case where the second stroke and the first stroke form the connection relation but do not form a closed graphic, an end-point value in the first stroke connected with the second stroke is replaced with an end-point value in the second stroke not connected with the first stroke from the storage area.

That is, for a jth stroke, a connection relation between the jth stroke and previous strokes is determined according to a relation between an end-point value of the jth stroke and the first end-point value and the second end-point value in the storage area; and in the case where the jth stroke and the previous strokes form the connection relation but do not form a closed graphic, an end-point value in the previous strokes connected with the jth stroke is replaced with an end-point value in the jth stroke not connected with the previous strokes in the storage area.

In other embodiments, a centralized determining is performed for a plurality of consecutive strokes, that is, a connection relation between an end point of one certain stroke (for example, a jth stroke) in the plurality of current consecutive strokes and previous strokes is judged, and then it is determined whether the stroke set forms a closed graphic. That is, a stroke in the consecutive strokes is sequentially taken as a to-be-processed stroke according to a time sequence, and it is determined whether the stroke set forms a closed graphic according to a connection relation between an end point of the to-be-processed stroke and previous strokes, wherein the to-be-processed stroke is the jth stroke in the stroke set.

The determining whether the stroke set forms a closed graphic according to coordinate data of the input stroke comprises: in the case where one end point of the to-be-processed stroke and a (j–m)th stroke form a connection relation and the other end point of the to-be-processed stroke and a (j–n)th stroke form a connection relation, determining that the stroke set forms a closed graphic, wherein m and n are positive integers, and m is greater than or equal to n; in the case where either end point of the to-be-processed stroke and the previous strokes form no connection relation, determining that no connection relation is formed between the to-be-processed stroke and the previous strokes and the stroke set does not form a closed graphic; and in the case where one end point of the to-be-processed stroke and one stroke in the previous strokes form a connection relation, but the other end point of the to-be-processed stroke and other strokes do not form a connection relation, determining that the to-be-processed stroke and the previous strokes form a connection relation but the stroke set does not form a closed graphic. A connection relation are formed between the previous strokes but the previous strokes do not form a closed graphic.

In the case where it is determined that a connection relation is formed between the to-be-processed stroke and the previous strokes but the stroke set does not form a closed graphic, a (j+1) stroke is taken as the to-be-processed stroke of the stroke set, and it is determined whether the stroke set forms a closed graphic according to a connection relation between an end point of the to-be-processed stroke and previous strokes; and in the case where it is determined that the to-be-processed stroke and the previous strokes form no connection relation and the stroke set does not form a closed graphic, no graph recognition is performed, for example, the stroke set is outputted as it is. In the case of outputting as it is, the stroke count can still be cleared, so as to facilitate determining of a relation between subsequent strokes.

The above various cases will be described below by taking an example that a stroke set comprises 8 consecutive strokes, j=4, m=2, n=1, and first to third strokes form a connection relation but do not form a closed graphic.

In the case where one end point of the fourth stroke and the second stroke form a connection relation and the other endpoint of the fourth stroke and the third stroke form a connection relation, it is determined that the second to fourth strokes form a closed graphic.

In the case where either end point of the fourth stroke and any of the first to third strokes form no connection relation, it is determined that the fourth stroke and the previous strokes form neither a connection relation nor a closed graphic. In this case, no graphic recognition is performed, for example, the first to fourth strokes can be outputted as they are. And the stroke count can be cleared, and corresponding processing is continued by taking a fifth stroke as a first stroke.

In the case where one end point of the fourth stroke and the second stroke form a connection relation but the other endpoint of the fourth stroke and the first stroke and the third stroke form no connection relation, it is determined that the fourth stroke and the previous strokes forms a connection relation but do not form a closed graphic. In this case, a fifth stroke is further taken as a to-be-processed stroke, and the foregoing determining is performed again, that is, it is determined whether the stroke set forms a closed graphic according to a connection relation between an end point of the to-be-processed stroke and previous strokes.

However, for the strokes that form a closed graphic, in the step S5, the category of the closed graphic can be recognized by using a deep learning algorithm according to coordinate data of the trajectory points included in the strokes.

The category of the closed graphic can include various standard or non-standard graphics, alternatively referred to as regular or irregular graphics, alternatively referred to as symmetric or asymmetric graphics. Specifically, the category of the graphic can include at least one of polygon, circle, or ellipse. The polygon can include, for example, a symmetric graphic such as a rectangle, an isosceles triangle, an isosceles trapezoid, or a parallelogram, or an asymmetric graphic such as a non-isosceles triangle or a non-isosceles trapezoid. It should be understood that closed graphics all satisfy a basic feature of a graphic, for example, for a stroke forming a circle, coordinates of each trajectory point should satisfy a certain condition, that is, there are at least offsets of up, down, left and right four directions between the trajectory points.

After the category of the closed graphic is recognized in the step S5, a corrected drawn graphic corresponding to the hand-drawn graphic can be outputted according to the category of the closed graphic.

The above corrected drawn graphic is a graphic after necessary correction is performed on the hand-drawn graphic, for example, a hand-drawn line is corrected to a straight line (e.g., corresponding to a polygon) or a curve (e.g., corresponding to a circle or an ellipse) according to a relation between trajectory points included in the hand-drawn line.

In some embodiments, the category of the closed graphic is recognized using a recurrent neural network (RNN). For example, recognition of a category of a graphic is performed by employing a bidirectional long-short term memory (BiL-STM) network in conjunction with a linear layer, so that a comprehensive and accurate recognition result is obtained.

The number of layers of a LSTM network can be determined according to difficulty and time consumption of a task, and one or more layers can be employed. A function of the linear layer is to linearly transform a specified dimension of an output. A more complex RNN network can also be used according to accuracy requirements.

FIG. 2 is a flow diagram illustrating a hand-drawn graphic recognition method according to another embodiment of the present disclosure. FIG. 2 is different from FIG. 1 in that the hand-drawn graphic recognition method in FIG. 2 further comprises steps S7 and S9. Only differences between FIG. 2 and FIG. 1 will be described below, and the same parts will not be described again.

In step S7, key points of the hand-drawn graphic are positioned. In some embodiments, the key points of the hand-drawn graphic are positioned based on coordinate offsets between trajectory points. The key point can also be referred to as an inflection point or corner point of the graphic, which represents that there is a significant change in slope at that trajectory point. For example, for a polygon, intersections of various sides are inflection points or corner points. It should be understood that an execution order of the step S7 and the step S5 of recognizing the category of the graphic is not limited, and the step S7 can be executed first and then step S5 is executed, or the step S5 can be executed first and then the step S7 is executed. Naturally, it has a higher calculation efficiency when recognizing the category of the graphic first and then positioning the key points of the graphic based on the category of the graphic.

A flow of positioning key points of the hand-drawn graphic according to some embodiments of the present disclosure will be described below in conjunction with FIG. 2A. As shown in FIG. 2A, the flow of positioning the key points of the hand-drawn graphic includes steps S71 to S73.

In step S71, coordinate offsets between trajectory points are calculated. The coordinate offsets comprise abscissa offsets and ordinate offsets. For an information sequence comprising trajectory points $P_i$, $P_{i+1}$, and $P_{i+2}$ . . . $P_{i+n}$, let a coordinate offset between trajectory points $P_{i+n+1}$ and $P_{i+n}$ be $O_n$, a coordinate offset between trajectory points $P_{i+n}$ and $P_{i+n-1}$ be $O_{n-1}$, and the coordinate offsets $O_n$ and $O_{n-1}$ are adjacent coordinate offsets.

In step S72, the coordinate offsets are divided into a plurality of intervals according to the abscissa offsets and ordinate offsets between the trajectory points.

For the calculated coordinate offset, the abscissa offset is denoted as dx and the ordinate offset is denoted as dy. That is, $O_n$ can be denoted as $(dx_n, dy_n)$. The coordinate offsets are divided into the plurality of intervals by comparing dx and dy. The number of the divided intervals is determined according to the recognition difficulty of the hand-drawn graphic.

In some embodiments, in order to reduce the amount of calculation, the abscissa offsets and the ordinate offsets between the trajectory points can also be reassigned respectively according to intervals to which the coordinate offsets belong; and a relation between the intervals to which the coordinate offsets belong is determined according to the reassignment. The reassignment is convenient for identifying the interval to which the coordinate offset belongs, and can intuitively reflect a trend of the inputted trajectory points. Compared with positioning the key points of the graphic based on a slope, positioning the key points of the graphic based on the coordinate offset is simpler and has less calculation.

The interval division and reassignment will be described below with reference to Table 1 by taking the division into 4 intervals as an example. Table 1 shows interval division result, reassignment result, and relation of coordinate offsets.

TABLE 1

| interval division result, relation of coordinate offsets and reassignment result | | | |
|---|---|---|---|
| relation of coordinate offsets | | interval division result | reassignment |
| dy > 0 | dx ≥ dy | first interval | 1 |
| | −dx ≥ dy | third interval | 3 |
| | dx < dy or −dx < dy | second interval | 2 |
| dy < 0 | dx ≥ −dy | first interval | 1 |
| | −dx ≥ −dy | third interval | 3 |
| | dx < −dy or −dx < −dy | fourth interval | 4 |

As shown in Table 1, for two trajectory points, if dy>0, a coordinate offset with 0<slope dy/dx≤1 is divided into the first interval, a coordinate offset with −1≤slope dy/dx<0 is divided into the third interval, and a coordinate offset with slope dy/dx>1 or slope dy/dx<−1 is divided into the second interval; and if dy<0, a coordinate offset with −1≤slope dy/dx<0 is divided into the first interval, a coordinate offset with 0<slope dy/dx≤1 is divided into the third interval, and a coordinate offset with slope dy/dx>1 or slope dy/dx<−1 is divided into the fourth interval.

For the first interval and the third interval, an absolute value |dy/dx| of the slope is less than or equal to 1, a reassignment result is that dy is equal to 0 and dx is equal to its original value; and for the second interval and the fourth interval, the absolute value |dy/dx| of the slope is greater than 1.

For the case where dy=0, a process similar to dy>0 or dy<0 can be performed.

Figure 2B:
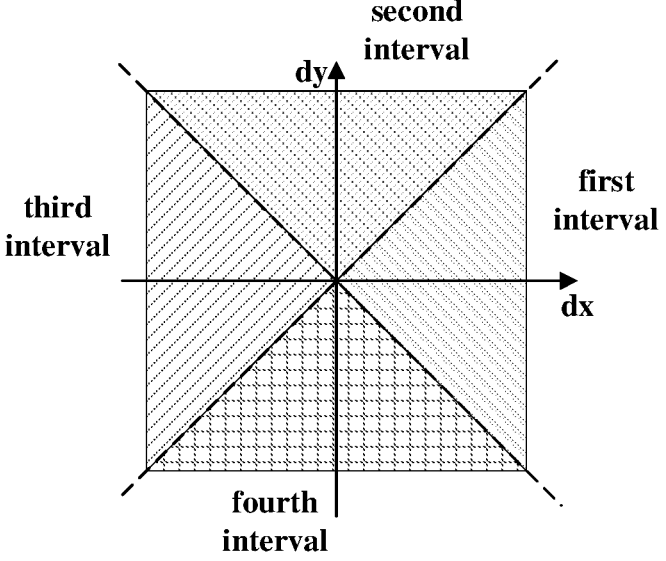
FIG. 2B is a schematic diagram illustrating interval division according to one embodiment of the present disclosure.

FIG. 2B illustrates a schematic diagram of interval division according to some embodiments of the present disclosure. As shown in FIG. 2B, a 360-degree interval can be divided into 4 intervals, an absolute value of the slope of the division is 1, and the interval division result according to Table 1 is intuitively shown. It should be appreciated that if the hand-drawn graphic is complex, more intervals, for example, 8 intervals or more, can be divided for finer calculation.

Next, in step S73, the key points of the hand-drawn graphic are positioned according to a relation between the intervals to which the coordinate offsets belong. How to position the key points of the hand-drawn graphic will be described below with reference to Table 2. Table 2 shows relation between intervals to which adjacent coordinate offsets belong, and corresponding key-point positioning result.

TABLE 2

| relation between intervals to which adjacent coordinate offsets belong and corresponding key-point positioning result | | |
|---|---|---|
| relation between intervals to which adjacent coordinate offsets $O_n$ and $O_{n-1}$ belong | | Key-point positioning result |
| a space between intervals | | there are key points, positioned based on trajectory point $P_{i+n}$ |
| intervals being adjacent | a first included angle between a line connected between trajectory points $P_{i+n}$ and $P_{i+n-1}$ corresponding to $O_n$ and a line connected between trajectory points $P_{i+n+1}$ and $P_{i+n}$ corresponding to $O_{n-1}$ is greater than a first angle threshold | there are key points, positioned based on the trajectory point $P_{i+n}$ |

17

TABLE 2-continued relation between intervals to which adjacent coordinate offsets
belong and corresponding key-point positioning result

| | relation between intervals to which adjacent coordinate offsets $O_n$ and $O_{n-1}$ belong | Key-point positioning result |
|---|---|---|
| | a first included angle between a line connected between trajectory points $P_{i+n}$ and $P_{i+n-1}$ corresponding to $O_n$ and a line connected between trajectory points $P_{i+n+1}$ and $P_{i+n}$ corresponding to $O_{n-1}$ is less than or equal to the first angle threshold; if an offset between offsets $O_{n-k}$ and $O_{n-1}$ is the same as an interval to which $O_{n-1}$ belongs but intervals to which the offsets $O_{n-k}$ and $O_{n-1}$ belong are different, a second included angle between a line connected between a trajectory point $P_{i+n-k+1}$ or $P_{i+n-k+2}$ corresponding to an offset $O_{n-k+1}$ and the trajectory point $P_{i+n}$ corresponding to $O_n$ and a line connected between the trajectory points $P_{i+n}$ and $P_{i+n+1}$ corresponding to $O_n$ is greater than a second angle threshold, or if an offset between offsets $O_{n+k}$ and $O_n$ is the same as an interval to which $O_n$ belongs but intervals to which the offsets $O_{n+k}$ and $O_n$ belong are different, a second included angle between a line connected between a trajectory point $P_{i+n+k-1}$ or $P_{i+n+k}$ corresponding to an offset $O_{n+k-1}$ and the trajectory point $P_{i+n}$ corresponding to $O_{n-1}$ and a line connected between the trajectory points $P_{i+n-1}$ and $P_{i+n}$ corresponding to $O_{n-1}$ is greater than the second angle threshold | there are key points, positioned based on the trajectory point $P_{i+n}$ |
| intervals being the same | if an offset between offsets $O_{n-k}$ and $O_{n-1}$ is the same as an interval to which $O_{n-1}$ belongs but intervals to which the offsets $O_{n-k}$ and $O_{n-1}$ belong are different, a second included angle between a line connected between a trajectory point $P_{i+n-k+1}$ or $P_{i+n-k+2}$ corresponding to an offset $O_{n-k+1}$ and a trajectory point $P_{i+n}$ corresponding to $O_n$ and a line connected between trajectory points $P_{i+n}$ and $P_{i+n+1}$ corresponding to $O_n$ is greater than the second angle threshold, or if an offset between offsets $O_{n+k}$ and $O_n$ is the same as an interval to which $O_n$ belongs but intervals to which the offsets $O_{n+k}$ and $O_n$ belong are different, a second included angle between a line connected between a trajectory point $P_{i+n+k-1}$ or $P_{i+n+k}$ corresponding to an offset $O_{n+k-1}$ and a trajectory point $P_{i+n}$ corresponding to $O_{n-1}$ and a line connected between trajectory points $P_{i+n-1}$ and $P_{i+n}$ corresponding to $O_{n-1}$ is greater than the second angle threshold | there are key points positioned based on the trajectory point $P_{i+n}$ |

As shown in Table 2, in the case where there is a space between intervals to which adjacent coordinate offsets $O_n$ and $O_{n-1}$ belong, the key points of the hand-drawn graphic is positioned based on a trajectory point $P_{i+n}$ to which the adjacent coordinate offsets $O_n$ and $O_{n-1}$ jointly correspond, where i is a positive integer, and n is a positive integer greater than 1. For example, a trajectory point $P_{i+n}$ to which offsets $O_n$ and $O_{n-1}$ jointly correspond can be taken as a key point of the hand-drawn graphic. As shown in FIG. 2B, there is a space between the first interval and the third interval, and there is no space between the first interval and the second interval or between the first interval and the fourth interval.

In the case where the intervals to which the adjacent coordinate offsets $O_n$ and $O_{n-1}$ belong are adjacent, it is determined whether a first included angle between a line connected between trajectory points $P_{i+n}$ and $P_{i+n-1}$ corresponding to $O_n$ and a line connected between trajectory points $P_{i+n+1}$ and $P_{i+n}$ corresponding to $O_{n-1}$ is greater than a first angle threshold; and in the case where the first included angle is greater than the first angle threshold, the key points of the hand-drawn graphic is positioned based on the trajectory point $P_{i+n}$ to which the adjacent coordinate offsets $O_n$ and $O_{n-1}$ jointly correspond. For example, the trajectory point $P_{i+n}$ to which offsets $O_n$ and $O_{n-1}$ jointly correspond can be taken as a key point of the hand-drawn graphic. As shown in FIG. 2B, the first interval is adjacent to the second interval or the fourth interval. The first angle threshold is, for example, 30 degrees.

In the case where the first included angle is not greater than the first angle threshold, or in the case where the intervals to which the adjacent coordinate offsets $O_n$ and $O_{n-1}$ belong are the same, if an offset between offsets $O_{n-k}$ and $O_{n-1}$ is the same as an interval to which $O_{n-1}$ belongs but intervals to which the offsets $O_{n-k}$ and $O_{n-1}$ belong are different, it is determined a second included angle between a line connected between a trajectory point $P_{i+n-k+1}$ or $P_{i+n-k+2}$ corresponding to an offset $O_{n-k+1}$ and a trajectory point $P_{i+n}$ corresponding to $O_n$ and a line connected between trajectory points $P_{i+n}$ and $P_{i+n+1}$ corresponding to $O_n$, where k is a positive integer greater than 2, and n is a positive integer greater than 3; or if an offset between offsets $O_{n\pm k}$ and $O_n$ is the same as an interval to which $O_n$ belongs, but intervals to which offsets $O_{n\pm k}$ and $O_n$ belong are different, it is determined whether a second included angle between a line connected between a trajectory point $P_{i+n+k-1}$ or $P_{i+n+k}$ corresponding to an offset $O_{n+k-1}$ and the trajectory point $P_{i+n}$ corresponding to $O_{n-1}$ and a line connected between trajectory points $P_{i+n-1}$ and $P_{i+n}$ corresponding to $O_{n-1}$ is greater than a second angle threshold.

In the case where the second included angle is greater than the second angle threshold, the key points of the hand-drawn graphic are positioned based on the trajectory point $P_{i+n}$ to which the offsets $O_n$ and $O_{n-1}$ jointly correspond. For example, the trajectory point $P_{i+n}$ to which offsets $O_n$ and $O_{n-1}$ jointly correspond can be taken as a key point of the hand-drawn graphic. The second angle threshold can be the same as the first angle threshold or can be slightly different.

In the embodiment of the present disclosure, the complex scene of the hand-drawn graphic is fully considered, for example, an included angle of broken lines hand-drawn by the user is an angle with an arc, and the key points of the hand-drawn graphic can be more accurately positioned by comprehensively analyzing the information of the trajectory points nearby.

In some embodiments, the hand-drawn graphic recognition method further comprises: performing sparse sampling on input trajectory points based on coordinates. After the sparse sampling, the category recognition and key-point positioning of the graphic can reduce unnecessary calculation and improve the speed of the graphic recognition. In some embodiments, before the category of the closed graphic is recognized or before the key points of the hand-drawn graphic are positioned, the sparse sampling is performed on the trajectory points according to a preset distance threshold, and a trajectory point set is obtained. For example, in the case where a distance between two input trajectory points is less than a preset threshold, any of the two input trajectory points is removed to obtain a trajectory point set. For example, for a distance between two trajectory points that is less than a preset threshold (for example, pixels), one of the trajectory points can be deleted, so that some dense trajectory points can be removed. For another example, for one trajectory point, in the case where a difference between a slope of a line connected between the trajectory point and its previous trajectory point and a slope of a line connected between the trajectory point and its subsequent trajectory point is less than or equal to a change threshold (for example, 0.1), the three trajectory points can be considered to be on one straight line, and thus the trajectory point can be deleted to reduce data to be recognized. For a simple hand-drawn graphic, a fixed trajectory-point number (for example, 40) can also be taken according to a situation, and then trajectory points are taken according to the fixed number. For example, for a quadrilateral, 8 trajectory points can be taken per side.

Further, sparse sampling on the trajectory point set can also be performed according to the number of trajectory points required by the recognition of the category of the closed graphic. The sparse sampling on the trajectory point set can also be performed according to the number of trajectory points required by the positioning of the key points of the hand-drawn graphic.

In step S9, a corrected drawn graphic corresponding to the hand-drawn graphic is outputted according to the category of the closed graphic and the key points.

Corresponding to the category of the closed graphic, the outputted corrected drawn graphic may be a regular graphic or an irregular graphic. In some embodiments, according to the category of the closed graphic recognized in the step S3, it can be first determined whether the closed graphic is a regular graphic in combination with the coordinates of the trajectory points.

For example, if a closed graphic is recognized as a polygon, a side length of each side of the polygon and an included angle between adjacent sides can be calculated according to coordinates of trajectory points, and then it is judged whether the closed graphic is a regular graphic. If a determining result is a regular graphic, parameters such as a central point, width, height and the like can be determined according to the coordinates of the trajectory points, and the regular graphic corresponding to the hand-drawn graphic is outputted. If the determining result is an irregular graphic, the irregular graphic corresponding to the hand-drawn graphic can be outputted according to calculated parameters such as the side length, the included angle and the like. For example, in the case where the hand-drawn graphic is recognized as an irregular triangle, corner points 1, 2, and 3 can be obtained by using key-point positioning, and the irregular triangle corresponding to the hand-drawn graphic can be outputted by connecting the 3 corner points.

Figure 3:
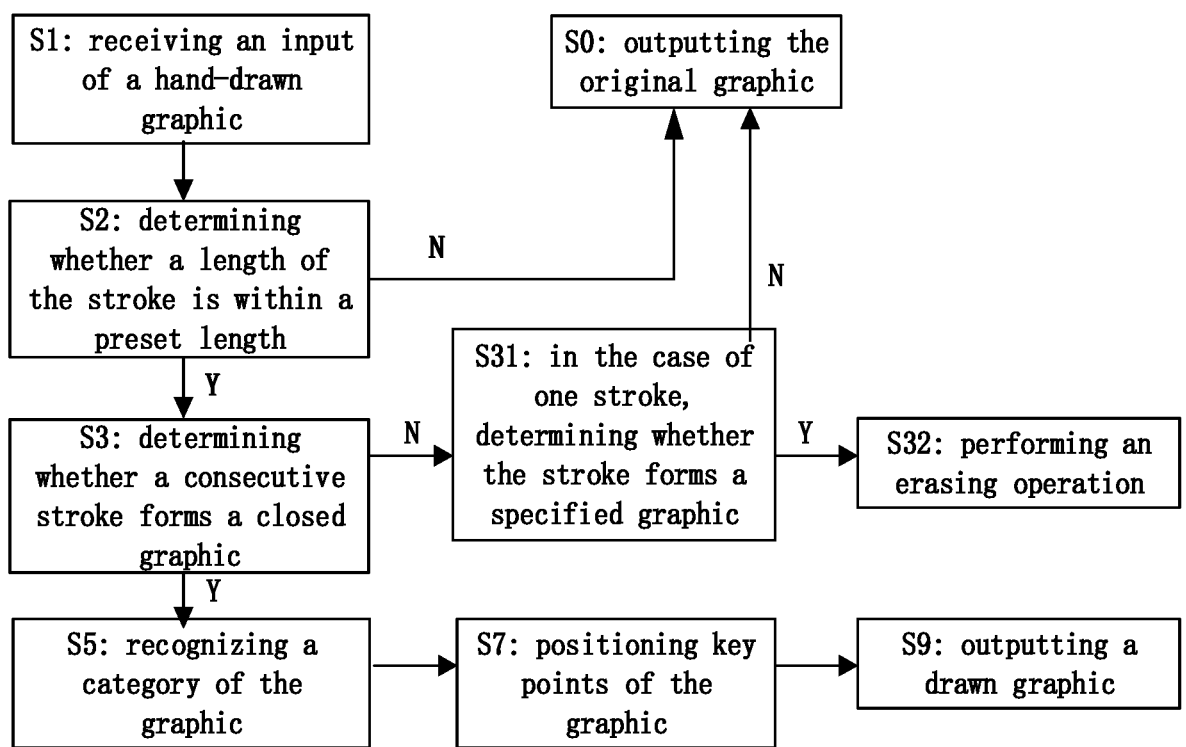
FIG. 3 is a flow diagram illustrating a hand-drawn graphic recognition method according to still another embodiment of the present disclosure.

FIG. 3 is a flow diagram illustrating a hand-drawn graphic recognition method according to still another embodiment of the present disclosure. FIG. 3 differs from FIG. 2 in that it further comprises step S2. Only the difference between FIG. 3 and FIG. 2 will be described below, and the same parts will not be described again.

As shown in FIG. 3, in step S2, it is determined whether a length of the stroke is within a preset length according to the coordinate data of the input stroke. In the case where the length of the stroke is within the preset length, the recognition of the closed graphic is performed by using the stroke. In the case where the length of the stroke is beyond the preset length, i.e., the length of the stroke is very long or short, it can be regarded as abnormal data, and the stroke is outputted as it is with no graphic recognition. In this way, the efficiency of the graphic recognition can be improved.

As shown in FIG. 3, for one stroke, if a closed graphic is formed, a category of the graphic is recognized, and a corrected drawn graphic is outputted accordingly; if no closed graphic is formed but it is judged in step S31 that a specified graphic (e.g., a shape of "Z") is formed, the flow proceeds to step S32 where an erasing operation is performed; and if neither the closed graphic nor the specified graphic is formed, the stroke is outputted as it is.

Of course, as mentioned above, for the case of one stroke, the recognition of the category of the graphic can also be directly performed instead of first judging whether a closed graphic is formed, and if a specified graphic is formed, an erasing operation is performed; and if no specified graphic is formed but it is recognized as a certain category of graphic, the corresponding category of graphic is drawn; otherwise, the stroke is outputted as it is.

In the foregoing embodiments, it can be determined, at a terminal side, whether the stroke set forms a closed graphic according to coordinate data of the input stroke, and in the case where the stroke set forms a closed graphic, the coordinate data of the corresponding stroke is sent to a cloud; and at a cloud side, the category of the closed graphic is recognized based on the coordinate data of the stroke.

Figure 4A:
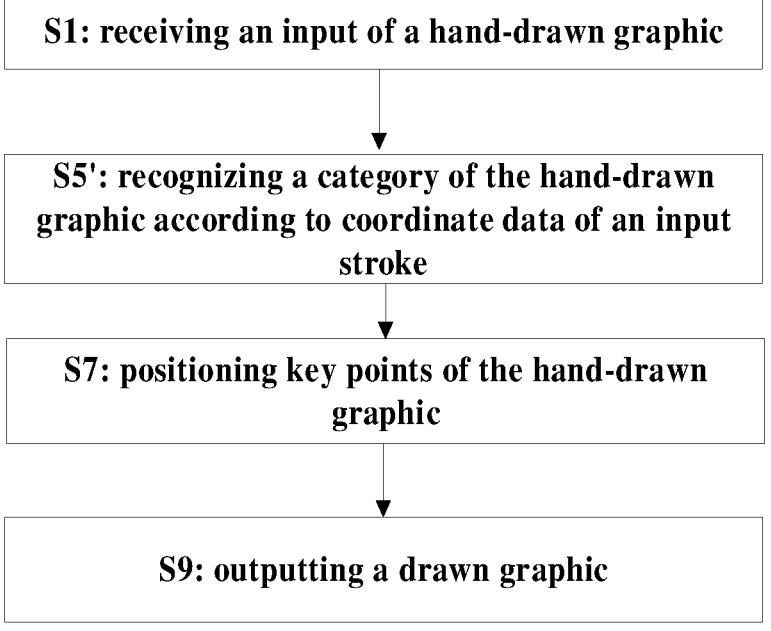
FIG. 4A is a flow diagram illustrating a hand-drawn graphic recognition method according to a further embodiment of the present disclosure.

FIG. 4A is a flowchart illustrating a hand-drawn graphic recognition method according to a further embodiment of the present disclosure.

As shown in FIG. 4A, the hand-drawn graphic recognition method comprises: step S1, receiving an input of a hand-drawn graphic; step S5', recognizing a category of the hand-drawn graphic according to coordinate data of an input stroke; step S7, positioning key points of the hand-drawn graphic; and step S9, outputting a corrected drawn graphic corresponding to the hand-drawn graphic according to the category and the key points of the hand-drawn graphic.

It can be seen that FIG. 4A differs from FIG. 2 in that the step S3 is not included and the step S5' differs from the step S5. Since the determining of the closed graphic in FIG. 2 does not need to be performed, that is, the step S3 may not be performed, the category of the hand-drawn graphic is recognized in the step S5', which is different from recognizing the category of the closed graphic in step S5.

In the above embodiment, the positioning of the key points of the hand-drawn graphic may be performed at a cloud.

So far, various method embodiments of the present disclosure have been described in detail, and corresponding product embodiments will be described below. An embodiment of the present disclosure further provides a hand-drawn graphic recognition apparatus.

Figure 4B:
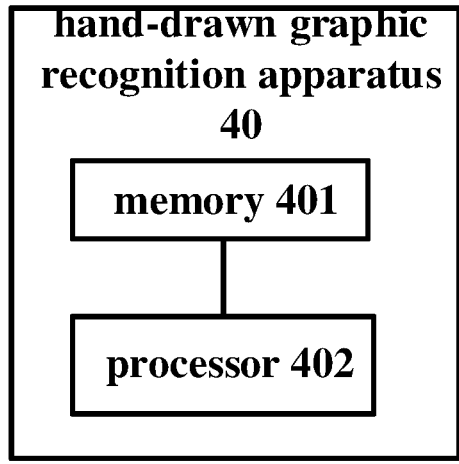
FIG. 4B is a block diagram illustrating a hand-drawn graphic recognition apparatus according to one embodiment of the present disclosure.

FIG. 4B is a block diagram illustrating a hand-drawn graphic recognition apparatus according to one embodiment of the present disclosure.

As shown in FIG. 4B, a hand-drawn graphic recognition apparatus 40 comprises: a memory 401 and a processor 402 coupled to the memory 401. The memory 401 is configured to store instructions for performing a corresponding embodiment of the hand-drawn graphic recognition method. The processor 402 is configured to perform, based on the instructions stored in the memory 401, one or more steps of the hand-drawn graphic recognition method in any of the embodiments of the present disclosure.

It should be understood that the one or more steps of the forgoing hand-drawn graphic recognition method can be implemented by the processor and can be implemented in any way of software, hardware, firmware, or a combination thereof.

In addition to the hand-drawn graphic recognition method and apparatus, an embodiment of the present disclosure can further take a form of a computer program product implemented on one or more non-volatile storage media having therein contained computer program instructions. Therefore, the embodiment of the present disclosure further provides a computer-readable storage medium having thereon stored computer instructions which, when executed by a processor, implement one or more steps of the hand-drawn graphic recognition method in any of the foregoing embodiments.

Figure 5:
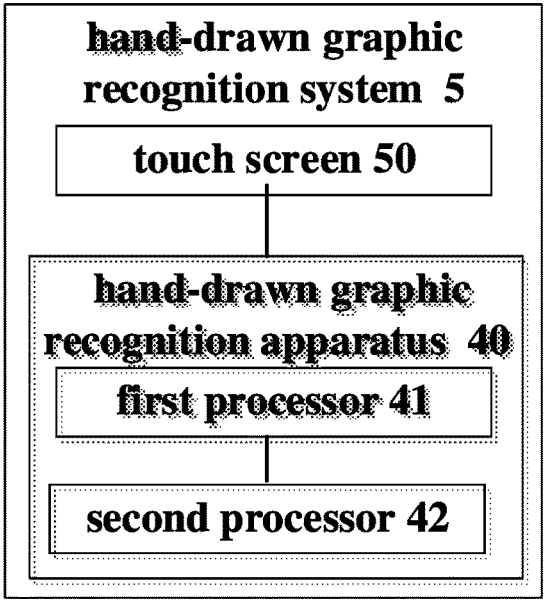
FIG. 5 is a block diagram illustrating a hand-drawn graphic recognition system according to one embodiment of the present disclosure.

FIG. 5 is a block diagram illustrating a hand-drawn graphic recognition system according to one embodiment of the present disclosure.

As shown in FIG. 5, a hand-drawn graphic recognition system comprises: a touch screen 50 configured to receive an input of a hand-drawn graphic and generate an information sequence comprising a plurality of trajectory points when a user hand-draws the graphic on the touch screen; and the foregoing hand-drawn graphic recognition apparatus 40.

In some embodiments, the hand-drawn graphic recognition apparatus 40 comprises: a first processor 41 located at a terminal and configured to determine whether a stroke set forms a closed graphic according to coordinate data of an input stroke; and a second processor 42 located at a cloud and configured to recognize a category of the closed graphic based on the coordinate data of the stroke in the case where the stroke set forms a closed graphic or, to position key points of the hand-drawn graphic.

Of course, both the first processor 41 and the second processor 42 of the hand-drawn graphic recognition apparatus 40 can also be located at the cloud service side, perform hand-drawn graphic recognition on the received hand-drawn trajectory point information sequence, and transmit a graphic recognition result to a specified receiving party, for example, a terminal.

Figure 6:
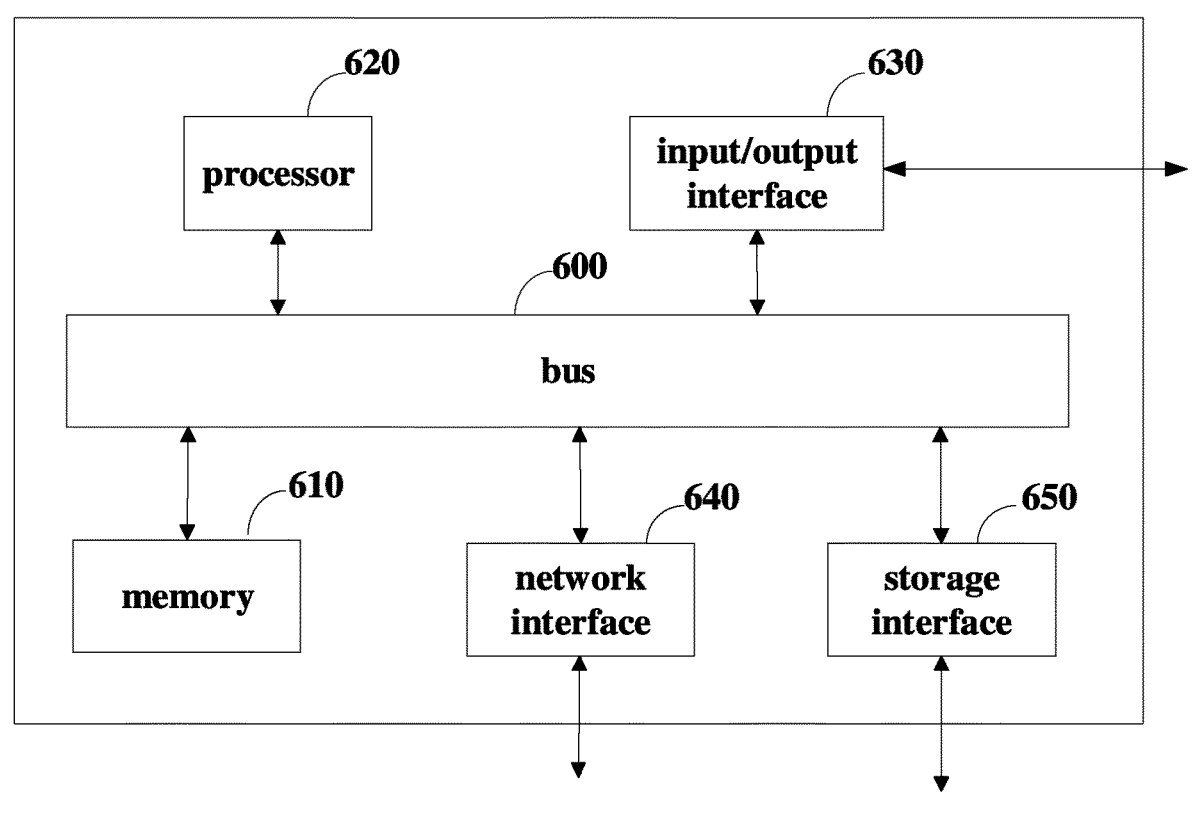
FIG. 6 is a block diagram illustrating a computer system for implementing some embodiments of the present disclosure.

FIG. 6 is a block diagram illustrating a computer system for implementing some embodiments of the present disclosure.

As shown in FIG. 6, the computer system can be embodied in a form of a general-purpose computing device, and it can be used for implementing the hand-drawn graphic recognition apparatus of the above embodiments. The computer system comprises a memory 610, a processor 620, and a bus 600 connecting different system components.

The memory 610 can include, for example, a system memory, non-volatile storage medium, and the like. The system memory has thereon stored, for example, an operating system, an application program, a boot loader, other programs, and the like. The system memory can include a volatile storage medium, for example, a random access memory (RAM) and/or a cache memory. The non-volatile storage medium has thereon stored, for example, instructions for performing a corresponding embodiment of the presented method. The non-volatile storage medium includes, but is not limited to, a magnetic disk memory, an optical memory, a flash memory, and the like.

The processor 620 can be implemented by a discrete hardware component, such as a general-purpose processor, digital signal processor (DSP), application specific integrated circuit (ASIC), field programmable gate array (FPGA) or other programmable logic device, discrete gate or transistor, and the like. Accordingly, each device, such as a determining device and a determination device, can be implemented by running, by a central processing unit (CPU), instructions that are in a memory for performing the corresponding steps, or by a dedicated circuit performing the corresponding steps.

The bus 600 can use any of a variety of bus architectures. For example, a bus architecture includes, but is not limited to, an industry standard architecture (ISA) bus, micro channel architecture (MCA) bus, and peripheral component interconnect (PCI) bus.

The computer system can further comprise an input/output interface 630, network interface 640, storage interface 650, and the like. Connections between these interfaces 630, 640, 650, and the memory 610 and the processor 620, can through the bus 600. The input/output interface 630 can provide a connection interface for an input/output device such as a display, a mouse, and a keyboard. The network interface 640 provides a connection interface for a variety of networking devices. The storage interface 640 provides a connection interface for an external storage device such as a floppy disk, a USB disk, and an SD card.

Thus far, various embodiments of the present disclosure have been described in detail. Some details well known in the art have not been described in order to avoid obscuring the concepts of the present disclosure. Those skilled in the art can fully appreciate how to implement technical solutions disclosed herein, in view of the foregoing description.

Although some specific embodiments of the present disclosure have been described in detail through examples, it should be understood by those skilled in the art that the above examples are for illustration only and are not intended to limit the scope of the present disclosure. It should be understood by those skilled in the art that the above embodiments can be modified or partial technical features thereof can be equivalently substituted without departing from the scope and spirit of the present disclosure. The scope of the present disclosure is defined by the attached claims.

What is claimed is:

1. A hand-drawn graphic recognition method, comprising:
   receiving an input of a hand-drawn graphic on a touch screen, the input comprising a stroke set, the stroke set comprising a plurality of strokes, each stroke comprising an information sequence of a plurality of trajectory points and two end points, information of each trajectory point comprising coordinates, writing time, and a writing state value of the trajectory point, wherein the writing state value represents a writing state of the trajectory point, and the writing state of the trajectory point comprises a pen-up and a pen-down;
   determining, by a processor, whether the stroke set forms a closed graphic according to coordinate data of an input stroke, comprising:
   determining whether an interval between pen-down time of a received current stroke and pen-up time of a previous stroke is less than an acquisition time threshold; and
   in response to determining the interval is less than the acquisition time threshold, taking the current stroke as a jth stroke of the stroke set, and determining whether the stroke set forms a closed graphic according to a connection relation between an end point of the current stroke and previous strokes, wherein j is a positive integer greater than 1;
   in response to determining the stroke set forms a closed graphic, recognizing, by the processor, a category of the closed graphic based on the coordinate data of the stroke, and, outputting, on the touch screen, a corrected drawn graphic corresponding to the hand-drawn graphic according to the category of the closed graphic.

2. The hand-drawn graphic recognition method according to claim 1, wherein in a case where a distance between an end point of one stroke and either end point of another stroke is less than a distance threshold, a connection relation is formed between the end point of the one stroke and the another stroke, and the determining whether the stroke set forms a closed graphic according to a connection relation between an end point of the current stroke and previous strokes comprises:

in a case where one end point of the current stroke and a (j−m)th stroke forms a connection relation and the other end point of the current stroke and a (j−n)th stroke forms a connection relation, determining that the stroke set forms a closed graphic, where m and n are positive integers, and m is greater than or equal to n, wherein a connection relation is formed between the previous strokes but the previous strokes do not form a closed graphic.

3. The hand-drawn graphic recognition method according to claim 2, wherein:

in a case where one end point of the current stroke and one stroke in the previous strokes form a connection relation but the other end point of the current stroke and other strokes form no connection relation, it is determined that a connection relation is formed between the current stroke and the previous strokes but the stroke set does not form a closed graphic, and it is determined whether a (j+1)th stroke is received within the acquisition time threshold; and in a case where the (j+1)th stroke is received within the acquisition time threshold, the (j+1)th stroke is taken as the current stroke of the stroke set, and it is determined whether the stroke set forms a closed graphic according to a connection relation between an end point of the current stroke and previous strokes.

4. The hand-drawn graphic recognition method according to claim 2, further comprising storing end-point values of the stroke in a storage area, wherein:

two end-point values are stored in the storage area, the two end-point values comprising a first end-point value and a second end-point value;

for a first stroke, the two end-point values of the first stroke are the first end-point value and the second end-point value, respectively;

for the jth stroke, a connection relation between the jth stroke and previous strokes is determined according to a relation between an end-point value of the jth stroke and the first end-point value and the second end-point value in the storage area, and in a case where the jth stroke and the previous strokes form a connection relation but do not form a closed graphic, an end-point value in the previous strokes connected with the jth stroke is replaced with an end-point value in the jth stroke not connected with the previous strokes in the storage area.

5. The hand-drawn graphic recognition method according to claim 1, wherein the stroke set comprises a plurality of consecutive strokes, each stroke comprising two end points, an interval between pen-down time of each stroke and pen-up time of a previous stroke in the plurality of consecutive strokes being less than the acquisition time threshold, and the determining whether the stroke set forms a closed graphic according to coordinate data of an input stroke comprises:

sequentially taking a stroke in the plurality of consecutive strokes as a to-be-processed stroke according to a time sequence, and determining whether the stroke set forms a closed graphic according to a connection relation between an end point of the to-be-processed stroke and previous strokes, wherein the to-be-processed stroke is a jth stroke in the stroke set, where j is a positive integer greater than 1.

6. The hand-drawn graphic recognition method according to claim 5, wherein in the case where a distance between an end point of one stroke and either end point of another stroke is less than a distance threshold, a connection relation is formed between the end point of the one stroke and the another stroke, and the determining whether the stroke set forms a closed graphic according to a connection relation between an end point of the to-be-processed stroke and previous strokes comprises:

in a case where a connection relation is formed between the previous strokes but the previous strokes do not form a closed graphic, one end point of the to-be-processed stroke and a (j−m)th stroke form a connection relation and the other end point of the to-be-processed stroke and a (j−n)th stroke form a connection relation, determining that the stroke set forms a closed graphic, where m and n are positive integers, and m is greater than or equal to n.

7. The hand-drawn graphic recognition method according to claim 1, further comprising for the first stroke in the stroke set, recognizing a category of a graphic formed by the stroke, and when the recognized category is a specified graphic, performing a handwriting processing operation preset for the specified graphic, wherein:

when the recognized category is not the specified graphic, it is determined whether the stroke forms a closed graphic;

when the stroke forms a closed graphic, a category of the closed graphic is recognized;

when the stroke does not form a closed graphic, it is determined whether a second stroke is received within the acquisition time threshold; and in a case where the second stroke is received within the acquisition time threshold, the second stroke is taken as a current stroke, it is determined whether the second stroke and the first stroke form a closed graphic.

8. The hand-drawn graphic recognition method according to claim 1, further comprising:

before recognizing the category of the closed graphic, performing sparse sampling on the trajectory points according to a preset distance threshold, to obtain a trajectory point set; or performing sparse sampling on the trajectory point set according to a number of trajectory points required for recognizing the category of the closed graphic.

9. A hand-drawn graphic recognition apparatus, comprising:

a memory; and a processor coupled to the memory, the processor being configured to perform, based on instructions stored in the memory device, one or more steps of the hand-drawn graphic recognition method according to claim 1.

10. A non-transitory computer-readable storage medium having thereon stored a computer program which, when executed by a processor, implements one or more steps of the hand-drawn graphic recognition method according to claim 1.

11. The hand-drawn graphic recognition method according to claim 1, wherein outputting, on the touch screen, a corrected drawn graphic corresponding to the hand-drawn graphic according to the category of the closed graphic comprises:

positioning key points of the hand-drawn graphic; and
outputting the corrected drawn graphic corresponding to
    the hand-drawn graphic according to the category and
    the key points of the closed graphic.

\* \* \* \* \*